| United States Patent | [11] 3,607,651 |

[72] Inventors Tatsuo Moroe
  Tokyo;
  Satohika Hattori, Yokohama-shi; Akira Komatsu, Tokyo; Yuzo Yamaguchi, Yokohama-shi, all of Japan
[21] Appl. No. 783,126
[22] Filed Dec. 11, 1968
[45] Patented Sept. 21, 1971
[73] Assignee Takasago Perfumery Co., Ltd
  Tokyo, Japan

[54] **METHOD FOR THE BIOCHEMICAL ISOLATION OF *l*-MENTHOL**
  7 Claims, No Drawings
[52] U.S. Cl. .................................................. 195/30, 195/2, 195/3
[51] Int. Cl. ..................................................... C12d 13/02
[50] Field of Search ............................................. 195/2, 30, 3

[56] References Cited
  OTHER REFERENCES
Chemical Abstracts 63:1865 ge

*Primary Examiner*—A. Louis Monacell
*Assistant Examiner*—Max D. Hensley
*Attorney*—Sughrue, Rothwell, Mion, Zinn & Macpeak ABSTRACT: Method for the biochemical isolation of *l*-menthol. Specifically, an improved method for the optical resolution of racemic menthol utilizing an enzyme, carboxylic ester hydrolase, produced by the action of a micro-organism belonging to the class of Penicillium, Gliocladium, Trichoderma, Geotrichum, Aspergillus, Pullaria, Fusarium, Absidia, Cunninghamella, Rhizopus, Actinomucor, Chlamyclomucor, Mucor, Gibberella, Streptomyces or Bacillus.

The *l*-menthol may be utilized in perfumes, medicines, etc.

METHOD FOR THE BIOCHEMICAL ISOLATION OF *l*-MENTHOL

BACKGROUND OF THE INVENTION

1. Field of the Invention

The present invention relates to a method for the biochemical isolation of *l*-menthol.

2. Description of the Prior Art

From the stereochemical configuration of menthol, four stereo isomers can exist, that is, menthol, isomenthol, neomenthol and neoisomenthol. Each of these stereo isomers has optical isomers (dextrorotatory *d* and levorotatory *l* forms) so there are eight optical isomers in all. Among these isomers *l*-menthol is one of the main components of natural mint oil, and illustrates the strongest refreshing activity so that it is widely used in perfumes and in medicines.

The *l*-menthol may be produced by a number of methods. For example, the crystal of *l*-menthol cam be isolated from natural mint oil by cooling. Synthetically, *l*-menthol can be obtained from *l*-menthone which is contained in natural mint oil by reduction with metallic sodium. On an industrial scale, *l*-menthol is produced from *d*-citronellal, which is a compound of citronella oil, by cyclization and hydrogenation. But as these natural raw materials (*l*-menthone and *d*-citronellal which have optical activities are available in a very limited supply, it is desirable to synthesize *l*-menthol from low priced industrial chemicals.

When *l*-menthol is synthesized from optically inactive raw materials, one important problem is to separate only optically active *l*-menthol from a mixture of *d l*-menthol isomers, because the simultaneous formation of all of the *d l*-isomers (*d l*-menthol, *d l*-isomenthol, *d l*-neomenthol and *d l*-neoisomenthol) is unavoidable. Many attempts to separate *l*-menthol have been made in the past, but a successful industrial process has not yet been realized. For this reason, *d l*-menthol is actually utilized in many instances without complete product purity.

The main industrial process for *d l*-menthol synthesis consists of the hydrogenation of thymol and the heat equilibration of the resultant mixture of *d l*-menthol isomers to the following composition: *d l*menthol–about 70 percent; *d l*-isomenthol–about 20 percent; *d l*-neomenthol–about 10 percent; and *d l*-neoisomenthol–trace. Further, the ratio of these isomers would vary with reaction conditions making the product composition extremely variable.

Another method of *d l*-menthol synthesis consists of making a mixture of *d l*-menthol isomers, the components of which are primarily *d l*-menthol (about 70 percent), *d l*-isomenthol and *d l*-neomenthol, by cyclization and hydrogenation of *d l*-citronellal, with *d l*-menthol being separated therefrom.

The hitherto known methods for the optical resolution of the thus obtained *d l*-menthol involve the optical isolation of this compound from its phthalic acid semiesters, *l*-menthoxy acetic acid ester and *d l*-camphoric acid ester. These methods are too expensive and involve a procedure which is too complicated to be used on an industrial scale, and are therefore only utilized as laboratory processes.

SUMMARY OF THE INVENTION

It has been discovered that an optically active *l*-menthol may be biochemically isolated by a process which comprises the optical resolution of an organic carboxylic acid ester of *d l*-menthol, or by the optical resolution of the organic carboxylic acid esters of a mixture of *d l*-menthol isomers (*d l*-menthol, *d l*-isomenthol, *d l*-neomenthol and *d l*-neoisomenthol). An enzyme, or number of enzymes, which comprise carboxylic ester hydrolases which have been produced by the action of micro-organisms from the class consisting of Penicillum, Gliocladium, Trichoderma, Geotrichum, Aspergillus, Pullularia, Fusarium, Absidia, Cunninghamella, Rhizopus, Actinomucor, Chlamydomucor, Mucor, Gibberella, Streptomyces and Bacillus, may be utilized.

It is an object of the present invention to provide a method for the biochemical isolation of *l*-menthol.

It is another object of the present invention to provide a novel and industrializable method for the optical resolution of *d l*-menthol or a mixture of *d l*-menthol isomers containing *d l*-menthol.

It is still another object of the present invention to provide the practical and useful method for the production of *l*-menthol.

It is the other object of the present invention to provide industrially optical active *l*-menthol which is useful for the production of perfumes and medicines from thymol.

DESCRIPTION OF THE PREFERRED EMBODIMENTS

As a result of many investigations into the asymmetric hydrolysis of esters of *d l*-menthol isomers with organic carboxylic acids, such as *d l*-menthyl ester, *d l*-neoisomenthyl ester and *d l*-isomenthyl ester, by means of carboxylic ester hydrolase, which is obtained from some types of micro-organisms, as bacteria and mold, the present inventors have found that *d l*-menthyl ester and *d l*-isomenthyl ester were hydrolyzed, respectively, into *l*-menthol, *l*-isomenthol; that the *d*-form was never decomposed; that the *d l*-neomenthyl ester and the *d l*-neoisomenthyl ester were not attacked by carboxylic ester hydrolase; and finally that this fact offers a solution to the problem of obtaining *l*-menthol from the organic carboxylic acid esters of *d l*-menthol and organic carboxylic acid, or mixtures of esters of the *d l*-menthol isomers which contain *d l*-menthol therein. Further, the present method is applicable on an industrial scale to a much greater extent that former methods of optical resolution which can be used only in the laboratory.

The present invention is concerned with a method for the biochemical isolation of *l*-menthol which comprises treating an organic carboxylic acid ester of *d l*-menthol or mixture of this ester with organic carboxylic acid esters of *d l*-menthol isomers containing *d l*-menthol therein (wherein the organic carboxylic acid is formic acid or a fatty acid of the general formula: RCOOH, and R is an alkyl group or an alkenyl group of from 1 to 21 carbon atoms) with an enzyme, carboxylic ester hydrolase, which may be produced by the action of micro-organisms belonging to the group penicillium, Gliocladium, Trichoderma, Geotricum, Aspergillus, Pullularia, Fusarium, Absida, Cunninghamella, Rhizopus, Actinomucor, Chlamydomucor, Mucor, Gibberella, Streptomyces and Bacillus which have been separated from their cell bodies and their culture medium or which may alternatively be directly used in the form of their cell bodies or culture mediums containing the said enzyme; carboxylic ester hydrolase. The isomer-enzyme composite is subjected to asymmetric hydrolysis, and then an optically active *l*-menthol is separated.

The screening and selection of the micro-organisms (bacteria and mold) useful in producing carboxylic ester hydrolase has been practiced by determining the asymmetric hydrolysis activity of *d l*-menthyl ester (hydrolysis ration and angle of rotation). Finally micro-organisms producing the required enzyme, possessing the activity of carboxylic ester hydrolase, have been selected from the group consisting of Penicillium, Gliocladium, Trichoderma, Geotrichum, Aspergillus, Pullularia, Fusarium, Absidia, Cunninghamella, Rhizopus, Actinomucor, Chlamydomucor, Mucor, Gibberella, Streptomyces and Bacillus. The results of a determination of the asymmetric hydrolysis ratio according to this enzyme, carboxylic ester hydrolase, are set forth in Table 1. The test for the asymmetric hydrolysis of *d l*-menthyl acetate was performed as follows: micro-organisms fested were cultured under agitation for 2 days at a temperature of 27° C. in 100 g. of a media comprising glucose, phosphate and a peptone medium (17 g. of glucose, phosphate, peptone, 5 g. of yeast extract, 15 g. of glucose, 2 g. of agar and 1000 g. of water) for molds, and a standard medium (10 g. of peptone, 4 g. of meat extract, 1 g. of glucose, and 2 g. of agar) for bacteria. Then, *d l*-menthyl acetate was added to the culture medium at a concentration as shown in table 1 with agitation (shaking) being continued at a temperature of 27° C. for 2 days. The medium was subjected to steam distillation, the distillate being analyzed by gas chromatography means and the hydrolysis ratio (*l*-menthol ×100/*d l*-menthyl acetate +*l*-menthol) was calculated from the peak area of the gas chromatograms.

TABLE 1

| Organism | Concentration of *d l*-menthyl acetate (weight percent) | Hydrolysis ratio |
| --- | --- | --- |
| Penicillum frequentans | 2 | 27.4 |
| Penicillum spinulo-ramigenum | 1 | 14.8 |
| Gliocladium roseum | 1 | 12.0 |
| Gliocladium SP | 1 | 20.4 |
| Trichoderma viride | 2 | 60.2 |
| Trichoderma koningi | 1 | 57.2 |
| Trichoderma SP 9484 | 2 | 80.6 |
| Geotrichum Candidum | 1 | 68.8 |
| Geotrichum SP | 1 | 21.6 |
| Aspergillus flavus var asper | 1 | 55.2 |
| Aspergillus japonicus | 1 | 24.0 |
| Pullularia pullulans | 2 | 46.2 |
| Pullularia SP | 2 | 33.6 |
| Fusarium roseum | 2 | 19.0 |
| Fusarium graminearum | 1 | 18.8 |
| Absidia glauca var paradoxa | 2 | 98.4 |
| Absidia hyalospora | 2 | 98.6 |
| Cunninghamella ellegans | 2 | 76.4 |
| Cunninghamella SP | 1 | 20.0 |
| Rhizopus peka | 1 | 69.2 |
| S nigricans | 1 | 40.0 |
| Actinomucor repens | 2 | 26.8 |
| Actinomucor SP | 1 | 12.3 |
| Chlamydomucor javanicus | 1 | 10.4 |
| Chlamydomucor SP | 1 | 15.6 |
| Mucor hiemalis | 1 | 25.8 |
| Mucor griseocyanus | 1 | 15.5 |
| Gibberella fujikuroi | 1 | 42.5 |
| Gibberella sanbiinetii | 1 | 15.5 |
| Streptomyces griseus | 1 | 10.0 |
| Streptomyces SP | 1 | 15.0 |
| Bacillus subtilis var niger | 5 | 97.5 |
| Bacillus mesentericus | 1 | 20.4 |
| Bacillus pumilus | 2 | 31.3 |

The classification of the fungi was based on "Ainsworth & Bisby's Dictionary of the Fungi," and that of bacteria was based on "Bergey's Manual of Determinative Bacteriology, 7th edition."

As the organic carboxylic acid used to produce the organic carboxylic acid ester of *d l*-menthol, formic acid and organic carboxylic acids of the general formula "RCOOH" were used (wherein R is an alkyl or an alkenyl group having from 1 to 21 carbon atoms). Examples of the acid are, for example, acetic acid, propionic acid, butyric acid, caproic acid, caprylic acid, capric acid, lauric acid, myristic acid, palmitic acid, stearic acid, acrylic acid, oleic acid, and erucic acid. Formic acid, acetic acid, propionic acid and myristic acid are best suited for use in the present invention of these carboxylic acids, especially acetic acid since it is lowest in cost and gives a high asymmetric hydrolysis ratio.

The most important, and characteristic, aspect of the present invention is the enzymatic treatment of an organic carboxylic acid ester of *d l*-menthol, or a mixture of the organic carboxylic acid esters of *d l*-menthol isomers containing the organic carboxylic acid ester of *d l*-menthol with carboxylic ester hydrolase produced by the action of micro-organisms as described above and utilizing the hydrolase to selectively hydrolyze the esters of *l*-menthol and *l*-isomenthol.

In the present invention, hydrolysis of the esters of *l*-menthol and *l*-isomenthol was carried out not only by shaking in contact with the growing micro-organisms or the intact cells thereof, but also by mixing with the culture medium free from living cells and with the cell-free extracts of the above described micro-organisms.

In carrying out this process, the preferred reaction temperature is 20–45° C., most preferably 25–30° C., in order to minimize inactivation of the enzymes by heat denaturation. The reaction time is about 24–48 hours at 25–30° C., but will be shorter at higher temperatures. The amount of enzyme utilized in crude form (for example, ex. 4), is about 0.1–0.5 percent based on the reaction mixture.

The amount of the organic carboxyclic esters of the mixture of *d l*-menthol isomers, is preferably in the range of about 1–10 percent of the reaction mixture. At higher concentrations, the rate of hydrolysis may be decreased. However, even at higher concentrations, the reaction rate may be increased by using a larger amount of the enzymes.

In general, as an economical amount of esters, there may be used from 1 to 10 percent of the esters per 0.1–0.5 percent of the crude enzyme solution or the corresponding culture fluid.

Among the foregoing *d l*-menthol isomers, *d l*-neoisomenthol can be converted into other menthol isomers by heat isomerization with a hydrogenating catalyst, thus a *d l*-neoisomenthol-free mixture can easily be obtained.

Upon performing the carboxylic ester hydrolase described on the mixture of organic carboxylic acid esters of these three *d l*-menthol isomers, *l*-menthol and *l*-isomenthol are released according to the asymmetric hydrolysis, and the other esters remain.

For example, in the case of the organic carboxylic acid esters of *d l*-menthol, only the *l*-form is hydrolyzed. The *d*-form is not affected and remains unchanged.

Separation of said *l*-menthol from the reaction mixture can easily be performed by a fractional distillation.

Further, *l*-menthol (m.p. 42–43° C., b.p. 216.5° C.) and *l*-isomenthol (m.p. 82.5° C., b.p. 218.6° C.) may simply be separated by rectification, a derivative formation (cyanoacetic acid ester, monochloroacetic acid ester, monophthalic acid ester, etc.), recrystallization, chromatography, etc. The following examples will serve to set forth the preferred embodiment of the present invention.

EXAMPLE 1

Asymmetric hydrolysis of *d l*-menthyl acetate by Absidia hyalospora was carried out as follows:

Twenty Kg. of the heretofore described glucose, phosphate, peptone medium was poured into a 30 *l* jar-fermentor, after heat sterilization (120° C., 15 min.). 500 g. of an Absidia hyalospora starter (cultured in the same medium at 27° C., for 2 days while being shaken into it) was inoculated into the fermentor, and the mixture was cultured for 24 hours at 27° C., an airflow of 5 *l*/min., and at a stirring rate of 200 r.p.m. Two hundred g. of *d l*-menthyl acetate were added to the culture fluid, and this mixture was kept at 27° C., with stirring at 300 r.p.m. for 24 hours. The fermented solution was steam distilled and the distillate was extracted with toluene and finally concentrated to give 180 g. of a concentrated oil.

From the results of a gas chromatographic analysis (inert solid support: celite, stationary liquid: silicon 20 percent, column dimensions: 2 m. ×0.3 cm., temperature 155° C., carrier gas: helium, pressure at entrance: 1 kg./cm²), the content of *l*-menthol was determined to be 49.5 percent.

By fractional distillation of the oil, *l*-menthol, b.p. 98° C./10 mm. Hg: [α]¹ᴰ=−50° C. (C=3: in ethanol) 75 g. and *d*-menthyl acetate, b.p. 109° C./10 mm. Hg. :[α]=+80° C. (C=4: in ethanol) 95 g., were determined.

EXAMPLE 2

Asymmetric hydrolysis of *d l*-menthol isomers by Trichoderma viride was carried out as follows.

Twenty Kg. of the heretofore-described glucose.phosphate.peptane medium was poured into a 30*l*jar-fermenter. After heat sterilization, there was injected thereinto 500 g. of a Trichoderma viride starter at 28° C. The starter was cultured for 24 hours, at 27° C. under an airflow of 5 l/min., and d stirring at 300 r.p.m., 200 g. of the acetates of d l-menthol isomers containing dl-menthol (d l-neomenthol 5.8 percent, d l-menthol 63,8 percent, d l-isomenthol 30.4 percent) were added, and the solution was held at 28° C., stirring it at 300 r.p.m., for 24 hours. After a steam distillation of the fermented solution, the distillation oil was extracted with toluene to yield 173 g. of the concentrated oil. From the results of a gas chromatographic analysis (same conditions as in example 1), the d l-neomenthol acetate was determined to be 5 percent, the d-menthyl acetate + d-isomenthyl acetate 48.5 percent, the l-menthol 28.8 percent, and the l-isomenthol 17.4 percent.

One hundred g. of the obtained oil was subject to a chromatographic analysis by utilizing alumina (1kg.) After developing with n-hexane, an elution with N-hexane (2l) was performed to give 50 g. of a mixture of d l-neomenthol acetate, d-menthyl acetate and d-isomenthyl acetate. A further elution with 2l of ethyl acetate was performed to give 45 g. of a mixture of l-menthol (62.3 percent) +l-isomenthol (37.7 percent).

This final mixture was esterified with monochloroacetic acid and recrystallized from methanol to separate a pure l-menthyl monochloroacetic acid ester $[\alpha]^{21}=-77.5°$ C. (in ethanol), m.p. 38° C.

By hydrolizing this ester with an aqueous solution of caustic soda, about 23 g. of l-menthol $[\alpha]^{18}=-50°$ C. (in ethanol) was obtained.

EXAMPLE 3

Separation of carboxylic ester hydrolase from the parent micro-organisms and the asymmetric hydrolysis of d l-menthyl acetate using the carboxylic ester hydrolase was carried out as follows.

Trichoderma SP 9482 was cultured in 1kg. of the heretofore-described glucose.phosphate.peptone medium, at 27° C., for 3 days with shaking. Ammonium sulfate was added to 900 g. of a filtrate of the culture medium (at a low temperature) at a 70 percent saturation degree. After allowing the solution to stand for 12 hours, crude enzymes were separated by a high-speed centrifugal separator from the solution and freeze dried to yield 3 g. of the crude enzyme.

Three g. of the crude enzyme were dissolved in 800 g. of water and 200 g. of a 2 percent polyvinyl alcohol emulsion. Twenty g. of d l-menthyl acetate were added, and the solution shaken; for 2 days at 27° C. After a steam distillation of the reaction mixture, the distillate was extracted with ether, dried, and concentrated to obtain 19 g. of oil. From the results of a gas chromatographic analysis (inert solid support: celite, stationary liquid: silicon 20 percent, column dimensions: 3m. ×0.3cm., temperature: 180° C., carrier gas: helium, pressure at entrance: 1 kg./cm.²) the content of l-menthol was determined to be 43.3 percent.

By fractional distillation of the oil, l-menthol $[(\alpha)^{18}=-50°$ (C.=4, in ethanol), b.p. 98° C./10 mm. Hg. ], was obtained in a yield of 7.3 g.

EXAMPLE 4

Asymmetric hydrolysis of d l-menthyl acetate by Bacillus subtillus var Niger was carried out as follows.

Bacillus subtillus var Niger was cultured in 1kg. of a general standard medium at 27° C. for 2 days, with shaking. Thirty g. of d l-menthyl acetate was added, and the solution was shaken at 27° C. for 2 days. After a steam distillation of the fermented solution, the distillate was extracted with ether and concentrated. The yield was 27 g. From the results of a gas chromotographic analysis, the content of l-menthol was determined to be 50.3 percent.

The concentrated oil was applied to 350 g. of chromatographic alumina to obtain 14 g. of d-menthyl acetate $[(\alpha)^{15}=-82°$ (C.=3, in ethanol) by elution with n-hexane. Twelve g. of l-menthol $(\alpha)^{15}=49°$ (C.=5, in ethanol] were obtained by further elution with benzene.

EXAMPLE 5

Asymmetric hydrolysis of d l-menthyl acetate by the liquid culture medium of Geotrichum candidium was carried out as follows.

Geotrichum candidium was cultured in a wheat bran medium (10 g. of wheat bran +90 g. of water) at 27° C. entrance: 3 days, with shaking. 2 g. of d l-menthyl acetate was added, and the solution shaken at 27° C. for 2 days. After a steam distillation of the fermented solution, the distillate was extracted with either and dried with magnesium sulfate to obtain 1.8 g. of oil, by concentration. From the results of a gas chromatographic analysis (inert solid support: celite, stationary liquid: silicon 20 percent, column dimension: 3m.=0.3cm., temperature: 180° C., carrier gas: helium, pressure at entrance: 1 kg./cm²), the content of l-menthol was determined to be 40.2 percent.

By applying the above to 30 g. of alumina utilized in chromatography, there was obtained 1 g. of d-menthyl acetate by elution with n-hexane, and 0.7 g. of l-menthyl $[\alpha]^{15}=50°$ (in ethanol) by further elution with benzene.

EXAMPLE 6

Asymmetric hydrolysis of d lmenthyl formate was carried out as follows.

Two g. of dl-menthyl formate was phosphate. to 100 g. of the liquid culture medium of Trichoderma SP 9484 (example 3) which was prepared by shaking at 27° C. for 2 days in the heretofore described glucose. phosphate. peptone medium. The composite was maintained at 27° C. for 2 days under agitation shaking. After a steam distillation of the fermented solution, the distillate was extracted with ether to obtain a concentrated oil (yield: 1.0 g.). g.) From the results of a gas chromagraphy analysis of the concentrated oil, the content of l-menthol was 17.45 percent. Further treatment by alumina chromatography as in example 5 yielded 300 mg. of l-menthol $[\alpha]^{20}=-45°$ C.

EXAMPLE 7

This example follows the basic procedure of example 6 with the exception that 2 g. of dl-menthyl propionate was employed instead of 2 g. of the dl-menthyl formate of example 6. The yield of the concentrated oil from the dl-menthyl propionate was 1.8 g. and the l-menthol content thereof was 49.98 percent. Chromotographic separation of the dlmenthyl propionate give 800 mg. of l-menthyl, $[\alpha]^{20}=-49°$ C.

EXAMPLE 8

Asymmetric hydrolysis of dl-menthyl mystrate by Trichoderma viride was carried out as follows.

Trichoderma viride was cultured in 1 kg. of the heretofore described glucose.phosephate.peptone medium at 27° for 2 days with shaking. Twenty g. of dl-menthyl mystrate were added and the solution further shaken at 27° C. for three days. After a steam distillation of the fermented solution, the distilled l-menthol was extracted with ether, dried with magnesium sulfate and concentrated to yield 1.7 g. of l-menthol, $[\alpha]^{26}=-30°$ (C.=6, in 95 percent of ethanol).

What is claimed is:

1. A method for the biochemical isolation of l-menthol which comprises:
   asymmetrically hydrolyzing a member selected from the group consisting of an organic carboxylic acid ester of dl-menthol and a mixture of organic carboxylic acid esters of dl-menthol isomers containing dlmenthol, wherein the organic carboxylic acid utilized to form said ester is selected from the group consisting of formic acid and fatty acids of the general formula RCOOH, wherein R is a member selected from the group consisting of an alkyl group and an alkenyl group having from 1 to 21 carbon atoms, said asymmetric hydrolysis being performed by an enzyme, carboxylic ester hydrolase, which has been produced by the action of micro-organisms belonging to the class consisting of Pencillium, Gliocladium, Trichoderma, Geotrichum, Aspergillus, Pullularia, Fusarium, Absidia, Cunninghamella, Rhizopus, Actinomucor, Chlamydomucor, Mucor, Gibberella, Streptomyces and Bacillus; and separating optically active *l*-menthol from the enzyme reaction mixture.

2. A process as in claim 1, wherein said carboxylic acid is acetic acid.

3. A process as in claim 1, wherein said hydrolyzation is conducted at a temperature of from about 20 to about 45° C.

4. A process as in claim 1, wherein the amount of enzyme utilized is from about 0.1 to 0.5 percent, by weight, based on the enzyme reaction mixture.

5. A process as in claim 1, wherein the amount of organic carboxylic ester is in the range of from about 1 to about 10 percent by weight, based on the reaction mixture.

6. A process as in claim 1, wherein said enzyme is utilized in the form of actively growing micro-organism cells from the defined class.

7. A process as in claim 1, wherein said enzyme is utilized in the form of a cell free extract produced from said micro-organisms.